United States Patent
Sudbrink et al.

(10) Patent No.: US 9,554,497 B2
(45) Date of Patent: *Jan. 31, 2017

(54) FRONT FOLDING ARRANGEMENT FOR AGRICULTURAL TILLAGE IMPLEMENT

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/528,356

(22) Filed: Oct. 30, 2014

(65) Prior Publication Data

US 2015/0156960 A1 Jun. 11, 2015

Related U.S. Application Data

(60) Provisional application No. 61/914,502, filed on Dec. 11, 2013.

(51) Int. Cl.
*A01B 73/06* (2006.01)
*A01B 29/04* (2006.01)
*A01B 73/04* (2006.01)

(52) U.S. Cl.
CPC ............ *A01B 29/048* (2013.01); *A01B 73/044* (2013.01); *A01B 73/065* (2013.01)

(58) Field of Classification Search
CPC ..... A01B 73/02; A01B 73/048; A01B 73/065; A01B 73/005; A01B 73/00; A01B 73/06; A01B 73/067

See application file for complete search history.

(56) References Cited

U.S. PATENT DOCUMENTS

| | | | |
|---|---|---|---|
| 2,828,680 A | 4/1958 | Johnson | |
| 3,588,139 A | 6/1971 | Bayne | |
| 3,880,241 A * | 4/1975 | Vincent | A01B 23/04 16/231 |
| 4,126,187 A * | 11/1978 | Schreiner | A01B 73/067 172/311 |
| 4,320,805 A | 3/1982 | Winter | |
| 4,418,762 A * | 12/1983 | Page | A01B 73/02 172/311 |
| 6,141,612 A * | 10/2000 | Flamme | A01B 63/1117 111/177 |
| 6,263,977 B1 | 7/2001 | Mayerle et al. | |
| 6,269,887 B1 | 8/2001 | Friggstad | |
| 6,374,923 B1 | 4/2002 | Friggstad | |

(Continued)

*Primary Examiner* — Matthew D Troutman
(74) *Attorney, Agent, or Firm* — Rebecca L. Henkel; Rickard K. DeMille

(57) ABSTRACT

An agricultural tillage implement including a main frame section having a pull hitch tube extending in a travel direction, which may be a telescoping pull hitch tube, and a tool bar coupled with and extending transverse to the pull hitch tube, and a plurality of pivotally coupled wing sections coupled with the main frame section. Each of the plurality of wing sections have at least one pivotal wing front shank frame. A main shank frame straddles the pull hitch tube. The main shank frame, the pivotal wing front shank frames, and the wing sections articulate from an operating configuration to a transport configuration.

18 Claims, 9 Drawing Sheets

(56) References Cited

U.S. PATENT DOCUMENTS

| | | | |
|---|---|---|---|
| 6,415,873 B1* | 7/2002 | Hudgins | A01B 35/16 172/311 |
| 6,550,543 B1 | 4/2003 | Friggstad | |
| 7,581,597 B2* | 9/2009 | Neudorf | A01B 73/067 172/1 |
| 7,604,068 B1* | 10/2009 | Friesen | A01B 73/065 172/311 |
| 7,926,247 B2 | 4/2011 | Van Den Engel | |
| 8,118,110 B2 | 2/2012 | Tamm et al. | |
| 8,141,653 B2* | 3/2012 | Ryder | A01B 73/067 172/311 |
| 8,342,256 B2 | 1/2013 | Adams et al. | |
| 8,567,517 B2* | 10/2013 | Friggstad | A01B 63/32 172/140 |
| 8,794,344 B2* | 8/2014 | Blunier | A01B 63/32 111/200 |
| 2005/0087350 A1* | 4/2005 | Bauer | A01C 7/208 172/311 |
| 2007/0240889 A1* | 10/2007 | Neudorf | A01B 73/067 172/311 |
| 2011/0284252 A1* | 11/2011 | Friggstad | A01B 63/32 172/310 |
| 2011/0290513 A1* | 12/2011 | Yuen | A01B 73/048 172/459 |
| 2014/0034342 A1* | 2/2014 | Friggstad | A01B 73/067 172/663 |
| 2014/0069670 A1* | 3/2014 | Friesen | A01B 73/02 172/311 |

* cited by examiner

FRONT FOLDING ARRANGEMENT FOR AGRICULTURAL TILLAGE IMPLEMENT

CROSS REFERENCE TO RELATED APPLICATIONS

This is a non-provisional application based upon U.S. provisional patent application Ser. No. 61/914,502 entitled "TILLAGE IMPLEMENT WITH FOLDABLE SHANK FRAME", filed Dec. 11, 2013, which is incorporated herein by reference.

BACKGROUND OF THE INVENTION

1. Field of the Invention

The present invention relates to agricultural tillage implements, and, more particularly, to agricultural field cultivators.

2. Description of the Related Art

Farmers utilize a wide variety of agricultural tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof.

As agricultural tillage implements become wider and wider over time, it becomes more difficult to keep the transport size of the implement within manageable limits. It also becomes more difficult to convert the agricultural tillage implement from an operating configuration to a transport configuration, or vice versa, without requiring too much time and difficulty on the part of the operator. It is desirable for the agricultural tillage implement to be converted from one mode to the other while the operator remains within the operator cab, through the use of hydraulics or other actuators. It is also desirable for the agricultural tillage implement to remain within certain geometric constraints so that it is not necessary to use a separate "escort vehicle" or the like when traveling on public roads.

SUMMARY OF THE INVENTION

The present invention provides an agricultural tillage implement with wing sections that are foldable to a compact transport configuration.

The invention in one form is directed to an agricultural tillage implement including a main frame section having a pull hitch tube extending in a travel direction, and a tool bar attached to and extending transverse to the pull hitch tube, and a plurality of pivotally coupled wing sections coupled about generally vertical axes with the main frame section. The main frame section has a main shank frame pivotally attached to the tool bar in such a way that it may be pivoted up and over the tool bar when in a transport configuration, or may be pivoted down and forward of the tool bar when in an operating configuration. The plurality of pivotally coupled wing sections can be pivoted forward about the generally vertical axes to a position adjacent to and generally parallel with the pull hitch tube when in the transport configuration, or may be pivoted outward about the generally vertical axes to a position perpendicular to the pull hitch tube when in the operating configuration. Each of the pivotally coupled wing sections has a wing front shank frame pivotally coupled to it, which wing front shank frame may be pivoted to a generally vertical position when in the transport configuration, or may be pivoted to a generally horizontal position when in the operating configuration.

The invention in another form is directed to a plurality of coupled wing section segments for an agricultural field cultivator, including at least one inner wing section segment pivotally coupled about at least one generally vertical axis to a main frame of the agricultural field cultivator. The plurality of coupled wing section segments can be pivoted forward about the generally vertical axes to a position adjacent to and generally parallel with the main frame section when in a transport configuration, and can be pivoted outward about the generally vertical axes to a position perpendicular to the main frame section when in an operating configuration. Additional wing section segments are pivotally coupled about longitudinal axes to the at least one inner wing section segments, such that the additional wing section segments may articulate vertically about their connection to the inner wing section segments.

The invention in yet another form is directed to a main frame section having a telescoping pull hitch tube extending in a travel direction and a tool bar attached to and extending transverse to the telescoping pull hitch tube. Rear lift wheels are connected to the main frame section and can be used to raise and lower the main frame section using hydraulics. The main frame section has a main shank frame pivotally attached to the tool bar in such a way that it may be pivoted up and over the tool bar when in a transport configuration, or may be pivoted down and forward of the tool bar when in an operating configuration. A plurality of pivotally coupled wing sections are connected to the main frame section and rotate about generally vertical axes at the rearward end of the telescoping pull hitch tube. The plurality of pivotally coupled wing sections can be pivoted forward about the generally vertical axes to a position adjacent to and generally parallel with the telescoping pull hitch tube when in the transport configuration, or may be pivoted outward about the generally vertical axes to a position perpendicular to the telescoping pull hitch tube when in the operating configuration. Diagonally angled draft tubes extend from the plurality of wing sections to the forward end of the telescoping pull hitch tube, and cooperate with the telescoping pull hitch tube to pivot the plurality of wing sections forward to the position adjacent to and generally parallel with the telescoping pull hitch tube upon extension of the telescoping pull hitch tube, and to pivot the plurality of wing sections outward to the position perpendicular to the telescoping pull hitch tube upon contraction of the telescoping pull hitch tube.

An advantage of the present invention is that the agricultural tillage implement may be quickly and efficiently reconfigured from the operating configuration to the transport configuration.

Another advantage is that the transport configuration of the agricultural tillage implement is kept within manageable limits while still allowing for the desired width and functionality of the agricultural tillage implement when in the operating configuration.

Another advantage is that reconfiguring the agricultural tillage implement from operating configuration to transport configuration and vice versa is accomplished without excessive time and difficulty on the part of the operator, and without requiring the operator to exit the operator cab.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
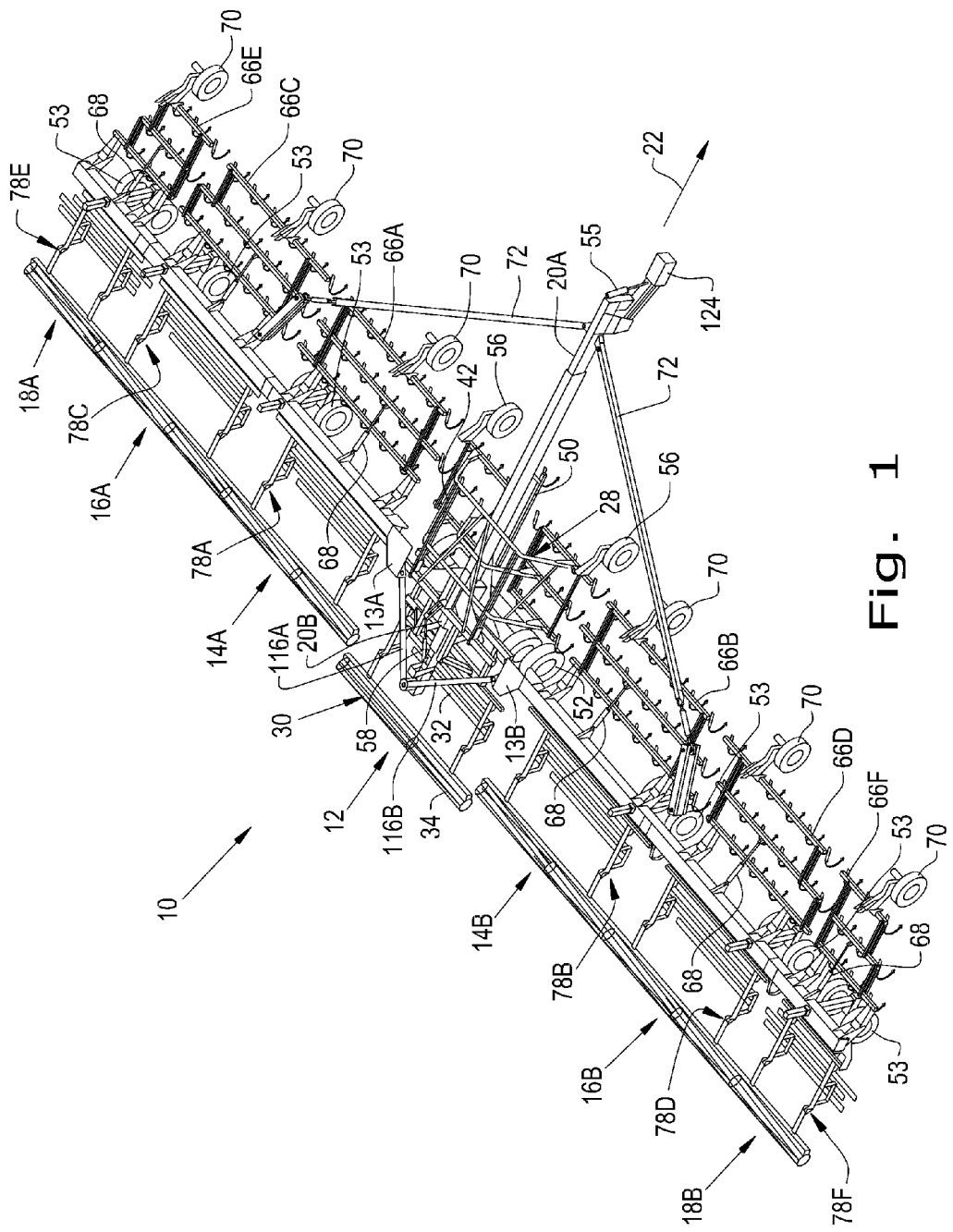
FIG. 1 is a top perspective view of an embodiment of an agricultural tillage implement of the present invention, in the form of a field cultivator.

Referring now to the drawings, and more particularly to FIGS. 1 through 5 and FIGS. 8 and 9, there is shown an embodiment of an agricultural tillage implement of the present invention. In the illustrated embodiment, the agricultural tillage implement is in the form of a field cultivator 10 for tilling and finishing soil prior to seeding.

Agricultural tillage implement 10 is configured as a multi-section field cultivator, and includes a main frame section 12 and a plurality of segmented wing sections 14A, 14B, 16A, 16B, 18A, and 18B. The left segmented wing sections are designated 14A, 16A and 18A, and the right segmented wing sections are designated 14B, 16B and 18B. Segmented wing sections 14A and 14B are each inner wing sections, segmented wing sections 16A and 16B are each middle wing sections, and segmented wing sections 18A and 18B are each outer wing sections. Each segmented wing section 14A, 14B, 16A, 16B, 18A, and 18B may be provided with a tool bar segment, so that left inner wing section segment 14A is provided with left inner tool bar segment 24A, right inner wing section segment 14B is provided with right inner tool bar segment 24B, left middle wing section segment 16A is provided with left middle tool bar segment 24C, right middle wing section segment 16B is provided with right middle tool bar segment 24D, left outer wing section segment 18A is provided with left outer tool bar segment 24E, and right outer wing section segment 18B is provided with right outer tool bar segment 24F. Intermediate wings 13A and 13B may be attached to main frame section 12, and may provide generally vertical axes 86 and 88 about which the plurality of segmented wing sections 14A, 14B, 16A, 16B, 18A, and 18B pivot.

Figure 2:
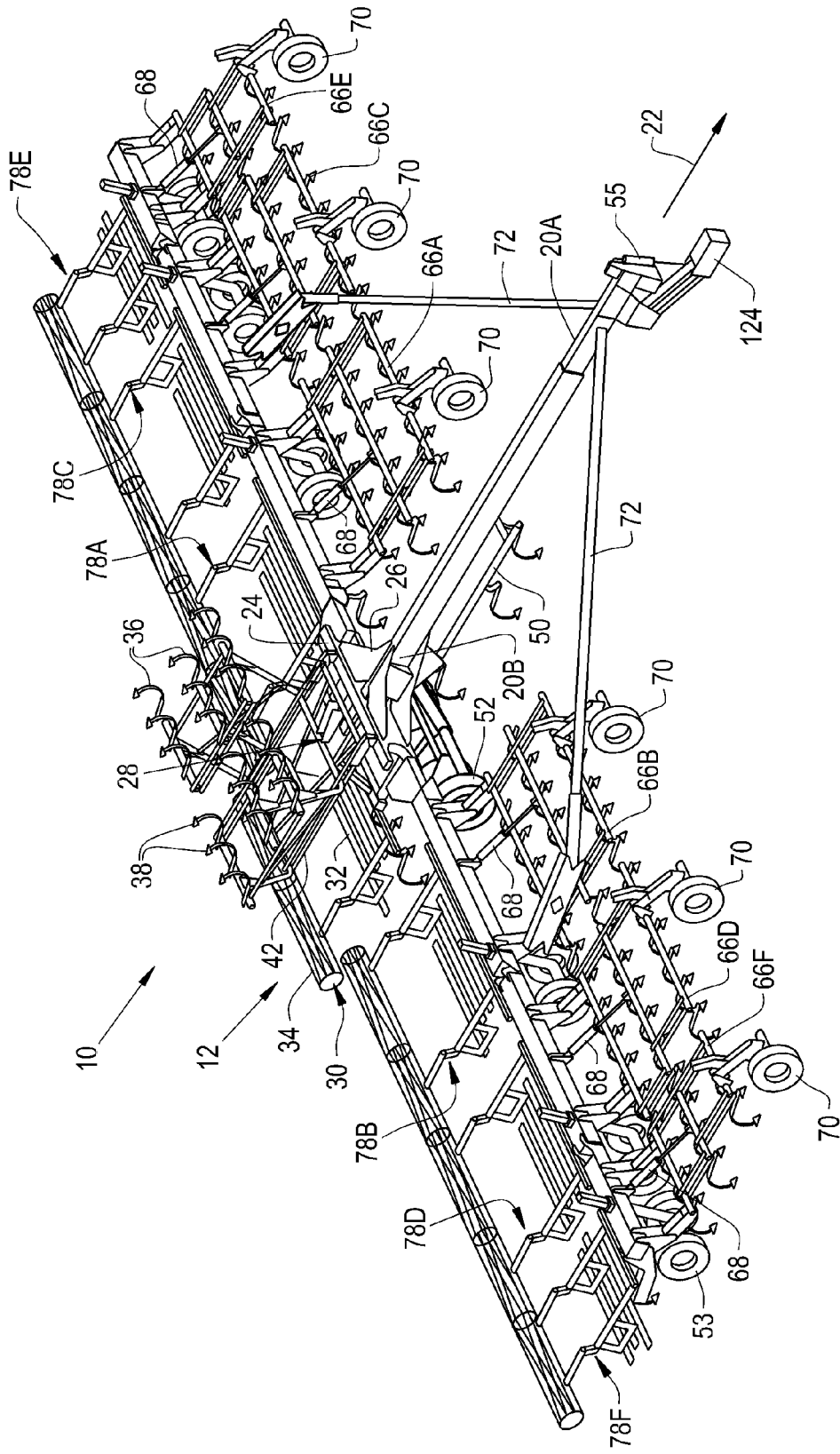
FIG. 2 is the same top perspective view shown in FIG. 1, with the main shank frame folded to a transport configuration.
Figure 3:
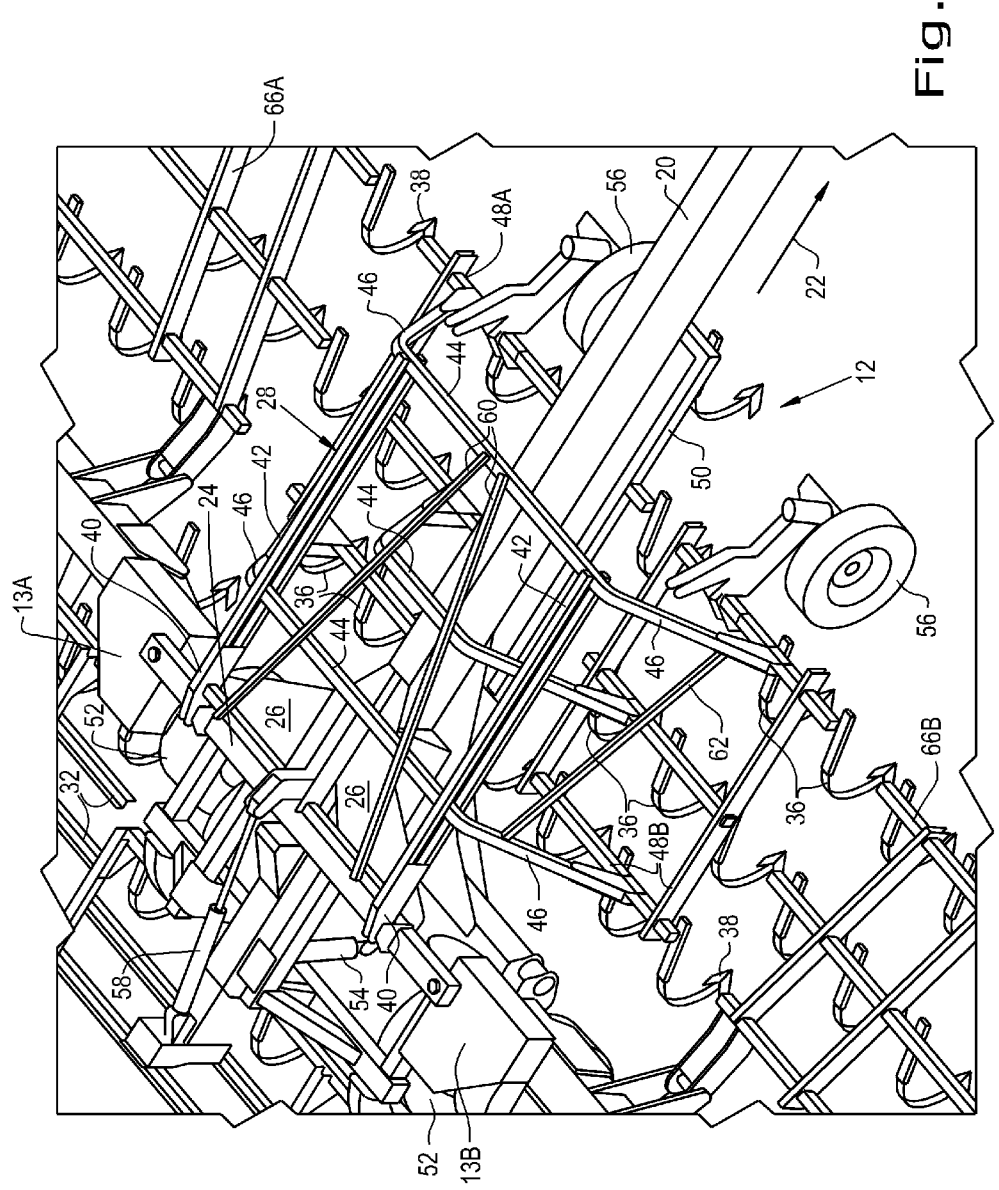
FIG. 3 is a top perspective view of the center frame section with the main shank frame in the operating configuration.

Main frame section 12 is the center section that is directly towed by a traction unit, such as an agricultural tractor (not shown). Main frame section 12 includes a pull hitch tube 20, which may be a telescoping pull hitch tube 20, including a forward end 20A and a rearward end 20B, extending in a travel direction 22, and a tool bar 24 which is coupled with and extends transverse to pull hitch tube 20 (FIGS. 2 and 3). Reinforcing gusset plates 26 may be used to strengthen the connection between pull hitch tube 20 and tool bar 24. Main frame section 12 generally functions to carry a main shank frame 28 for tilling the soil, and a main rear auxiliary implement 30 for finishing the soil. Main rear auxiliary implement 30 includes a spring tooth drag 32 and a rolling (aka, crumbler) basket 34 which coact with each other to finish the soil. However, main rear auxiliary implement 30 can be differently configured, such as a spike tooth drag, cultivator shanks, etc.

Figure 4:
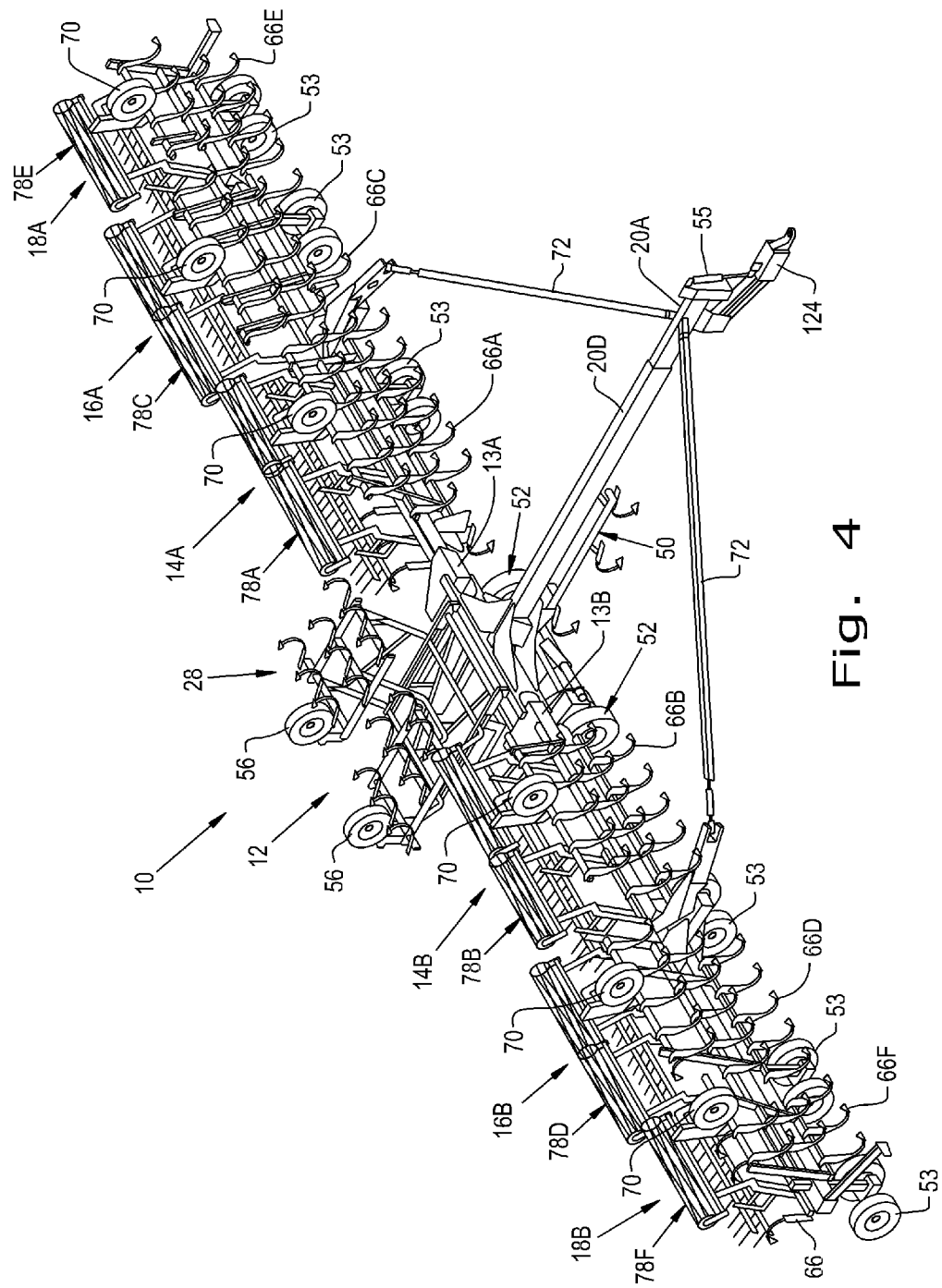
FIG. 4 is a top perspective view of the agricultural tillage implement shown in FIGS. 1-3, with the main shank frame folded rearward to a transport configuration and the wing front shank frames and wing section rear auxiliary implements folded upwards to a transport configuration.

Main shank frame 28 generally functions to carry cultivator shanks 36 with shovels 38 at their lower ends for tilling the soil. Main shank frame 28 is pivotally coupled with tool bar 24, preferably at the top of tool bar 24, such as with couplings 40. Main shank frame 28 is positioned in front of the tool bar 24 when in an operating configuration (FIGS. 1 and 3), and is foldable up and over the tool bar 24 to a position rearward of tool bar 24 when in a transport configuration (FIGS. 2 and 4). Main shank frame 28 includes two sets of longitudinal frame members 42 which are pivotally coupled with tool bar 24 at one end thereof using couplings 40.

A plurality of cross frame members 44 are coupled with the longitudinal frame members 42. Each of the cross frame members 44 have a pair of opposite outboard ends 46 which extend horizontally past longitudinal frame members 42, then in a downwardly angled direction, whereby the outboard ends 46 are positioned on opposite lateral sides of the pull hitch tube 20 when in an operating configuration. The outboard ends 46 of cross frame members 44 are coupled with a pair of respective main shank sub-frames, including left main shank sub-frame 48A and right main shank sub-frame 48B. Main shank sub-frames 48A and 48B are spaced apart from each other in a direction transverse to pull hitch tube 20 and are positioned on respective opposite lateral sides of pull hitch tube 20 when in an operating configuration.

A center shank sub-frame 50 is attached to and positioned below pull hitch tube 20. Since main shank sub-frames 48A and 48B are spaced apart on either side of pull hitch tube 20, center shank sub-frame 50 functions to till the soil in the intermediate open space between the two main shank sub-frames 48A and 48B. Center shank sub-frame 50 includes a number of cultivator shanks 36 and corresponding shovels 38; three in the illustrated embodiment. Center shank sub-frame 50 may be raised up and down with the raising and lowering of the main frame section 12 using rear lift wheels 52 using hydraulic cylinder 54 and using hydraulic cylinder 55 connected to pull hitch 124. Alternately, center shank sub-frame 50 may be raised or lowered independently of main frame section 12.

Main shank frame 28 also includes one or more gauge wheel assemblies 56 which function to level main shank sub-frames 48A and 48B. In the illustrated embodiment, main shank frame 28 includes two gauge wheel assemblies 56 which are respectively coupled with a front of a respective main shank sub-frame 48A or 48B. A hydraulic cylinder 58 is used to fold main shank frame 28 from the operating configuration to the transport configuration, and vice versa. Hydraulic cylinder 58 may optionally be placed in a "float mode" such that gauge wheel assemblies 56 are operable to float up and down as they traverse across a field and thereby set the operating depth at the front edge of main shank frame 28.

Main shank frame 28 may also include additional support frame members 60 and 62 which provide structural rigidity. Support frame members 60 extend diagonally across the top of main shank frame 28, and support frame members 62 extend diagonally between the outboard ends 46 of cross frame members 44.

During use, it is periodically necessary to move the field cultivator 10 from an unfolded (operating) configuration to a folded (transport) configuration. Hydraulic cylinder 54 may first be actuated to lift the main frame section 12 to the raised transport configuration using rear lift wheels 52 in cooperation with hydraulic cylinder 55 connected to pull hitch 124. Center shank sub-frame 50 may then be independently moved to a raised position if agricultural tillage implement 10 is provided with an independently movable center shank sub-frame 50. Toolbar lift wheels 53 lift wing sections 14A, 14B, 16A, 16B, 18A, and 18B to the raised transport position along with main frame section 12, which toolbar lift wheels 53 are then allowed to caster or pivot. Hydraulic cylinder 58 is then actuated to fold main shank frame 28 up and over tool bar 24 to an inverted position rearward of tool bar 24 (FIGS. 2 and 4). Crumbler basket 34 of main rear auxiliary implement 30 may then also be moved to a raised position.

Then left inner wing front shank frame 66A, right inner wing front shank frame 66B, left middle wing front shank frame 66C, right middle wing front shank frame 66D, left outer wing front shank frame 66E, and right outer wing front shank frame 66F of the wing sections 14A, 14B, 16A, 16B, 18A, and 18B are folded upwards to a generally vertical position using hydraulic cylinders 68 (FIG. 4) and are locked in the generally vertical position. Wing front shank frames 66A, 66B, 66C, 66D, 66E, and 66F of the wing sections 14A, 14B, 16A, 16B, 18A, and 18B may be folded upwards to the generally vertical position at the same time, or may be folded upwards to the generally vertical position sequentially.

Left inner wing section rear auxiliary implement 78A, right inner wing section rear auxiliary implement 78B, left middle wing section rear auxiliary implement 78C, right middle wing section rear auxiliary implement 78D, left outer wing section rear auxiliary implement 78E, and right outer wing section rear auxiliary implement 78F, each of which may include spring tooth drags, crumbler baskets, spike tooth drags, cultivator shanks, or any combination thereof, may then also be folded upwards to a generally vertical position and locked in the generally vertical position. Wing section rear auxiliary implements 78A, 78B, 78C, 78D, 78E, and 78F may also be folded upwards to a generally vertical position at the same time, or may be folded upwards to the generally vertical position sequentially. Further, crumbler basket 34 of main rear auxiliary implement 30 may be moved to its raised position at the same time that wing section rear auxiliary implements 78A, 78B, 78C, 78D, 78E, and 78F are folded upwards to their generally vertical positions.

Figure 5:
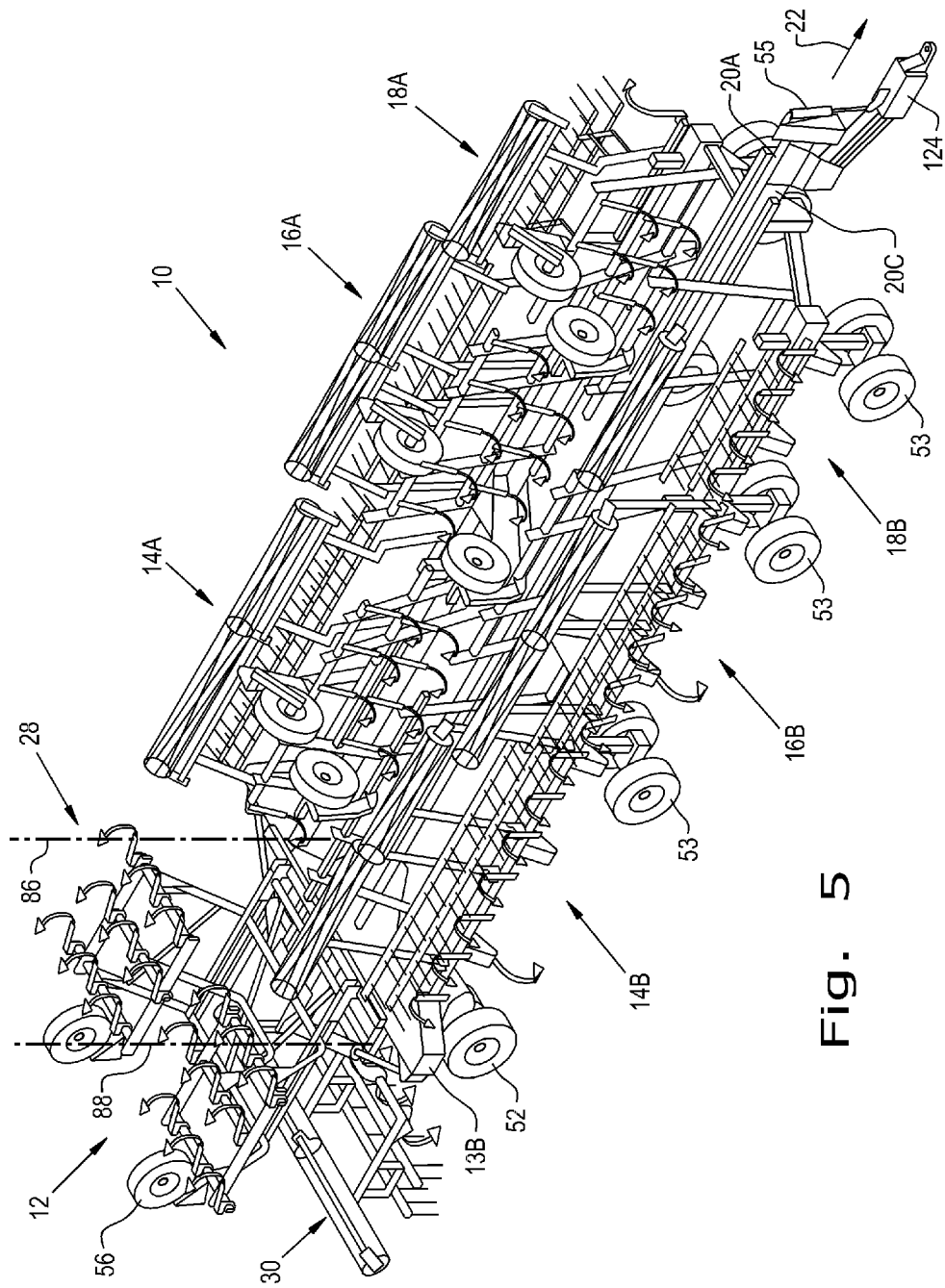
FIG. 5 is a top perspective view of the agricultural tillage implement shown in FIGS. 1-4, with the wing sections folded forward to a transport configuration.

Diagonally angled draft tubes 72 extending between a forward end 20A of pull hitch tube 20 and a respective tool bar 24C and 24D associated with the pair of middle wing sections 16A and 16B are then folded inward, and wing sections 14A, 14B, 16A, 16B, 18A, and 18B are then folded forward by left main fold hydraulic cylinder 116A and right main fold hydraulic cylinder 116B about generally vertical axes 86 and 88 which pass through intermediate wings 13A and 13B to a position adjacent to and generally parallel with pull hitch tube 20 (FIG. 5). Pull hitch tube 20 may be a telescoping pull hitch tube, in which arrangement the diagonally angled draft tubes 72 extend between the telescoping forward end 20A of the telescoping pull hitch tube 20, which extends 20C as wing sections 14A, 14B, 16A, 16B, 18A, and 18B pivot forward about generally vertical axes 86 and 88, and contracts 20D as wing sections 14A, 14B, 16A, 16B, 18A, and 18B pivot outward about generally vertical axes 86 and 88. Gauge wheel assemblies 56 at the front of main shank frame 28 and gauge wheel assemblies 70 at the front of wing sections 14A, 14B, 16A, 16B, 18A, and 18B are all configured as caster wheels and are not in contact with the ground when field cultivator 10 is in the folded or transport configuration. For unfolding the field cultivator 10 to the operating configuration, the reverse folding sequence is carried out.

Figure 6:
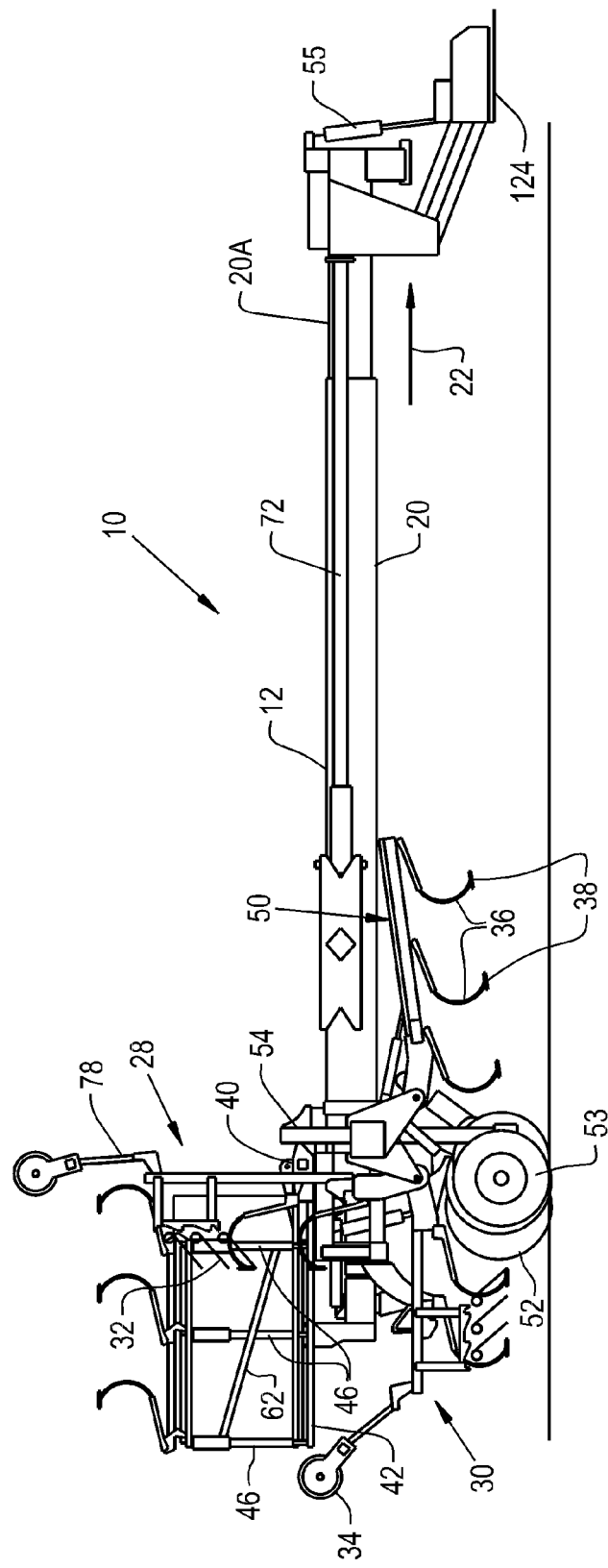
FIG. 6 is a side view of the agricultural tillage implement shown in FIGS. 1-5, with the main shank frame in the transport position, the main frame lifted, the center shank sub-frame raised, and the main rear auxiliary implement raised.

FIG. 6 shows a side view of the agricultural tillage implement shown in FIGS. 1-5, with the main shank frame 28 in the transport position, the main frame 12 lifted, the center shank sub-frame 50 raised, and the crumbler basket 34 of the main rear auxiliary implement 30 raised. For clarity, the wing front shank frames 66A, 66B, 66C, 66D, 66E, and 66F and the wing section rear auxiliary implements 78A, 78B, 78C, 78D, 78E, and 78F are not shown.

Figure 7:
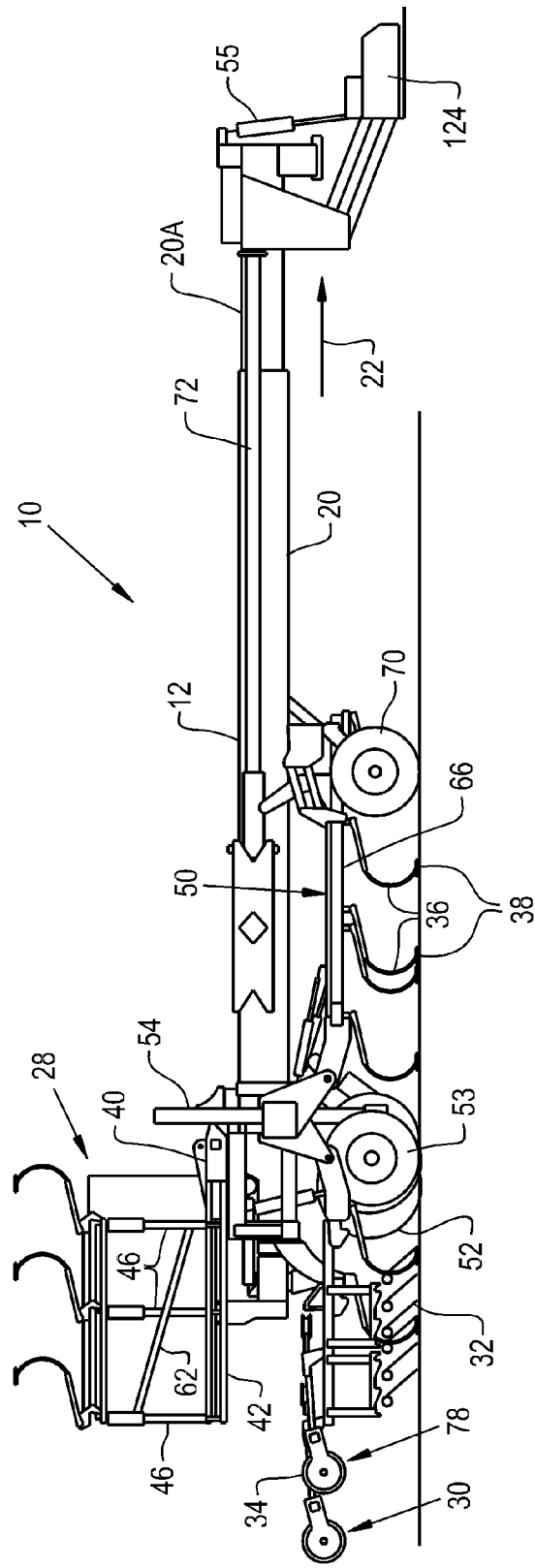
FIG. 7 is another side view of the agricultural tillage implement, similar to FIG. 6, with the main shank frame shown in the transport position for clarity, the main frame lowered, the center shank sub-frame lowered, the main rear auxiliary implement lowered, and the wing front shank frames and wing section rear auxiliary implements in their generally horizontal positions.
Figure 8:
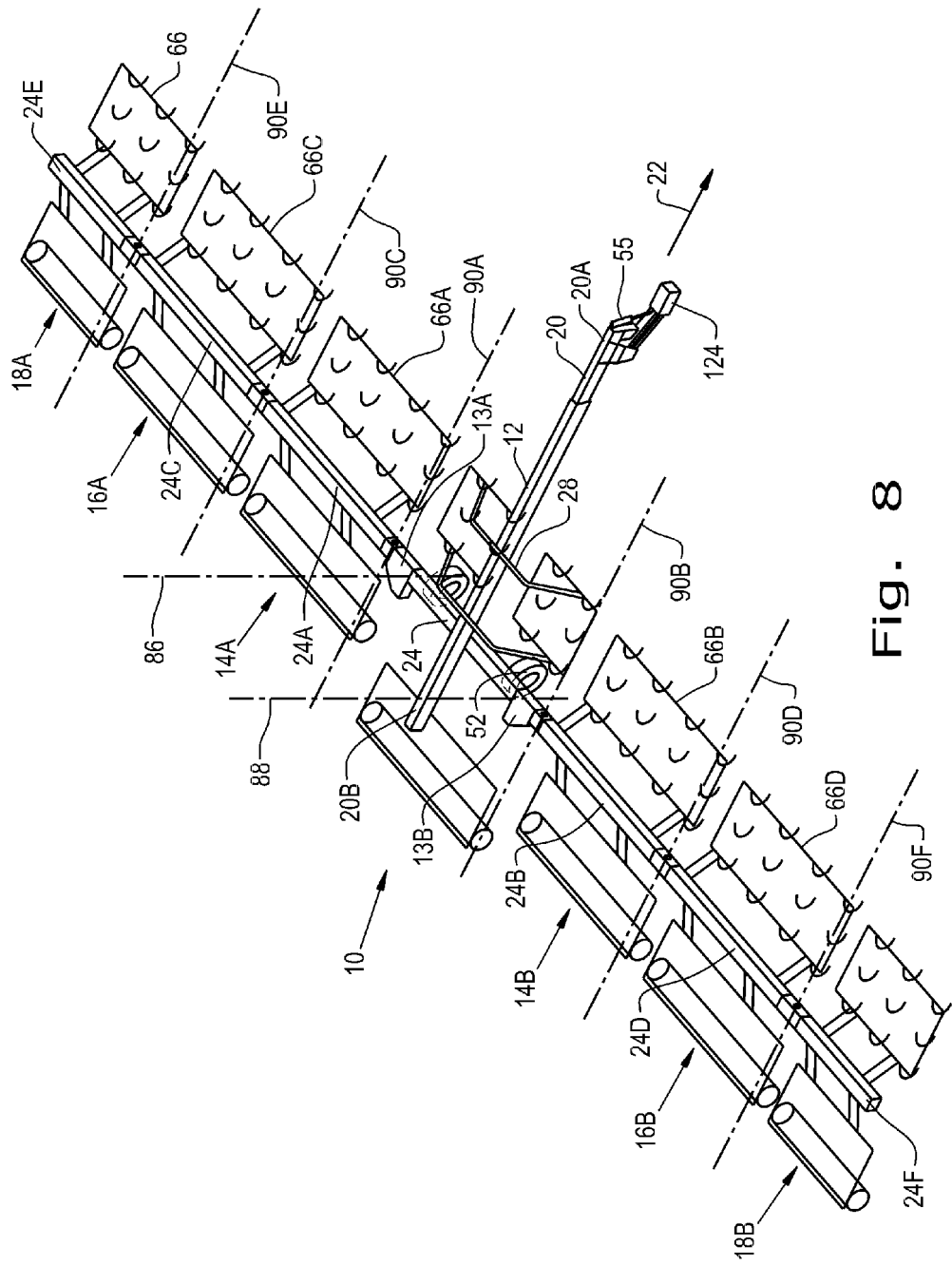
FIG. 8 is the same top perspective view shown in FIG. 1, showing the generally vertical axes about which the wing sections fold forward when placed in the transport configuration, and showing the longitudinal axes about which the segmented wing sections articulate vertically when following ground contours.
Figure 9:
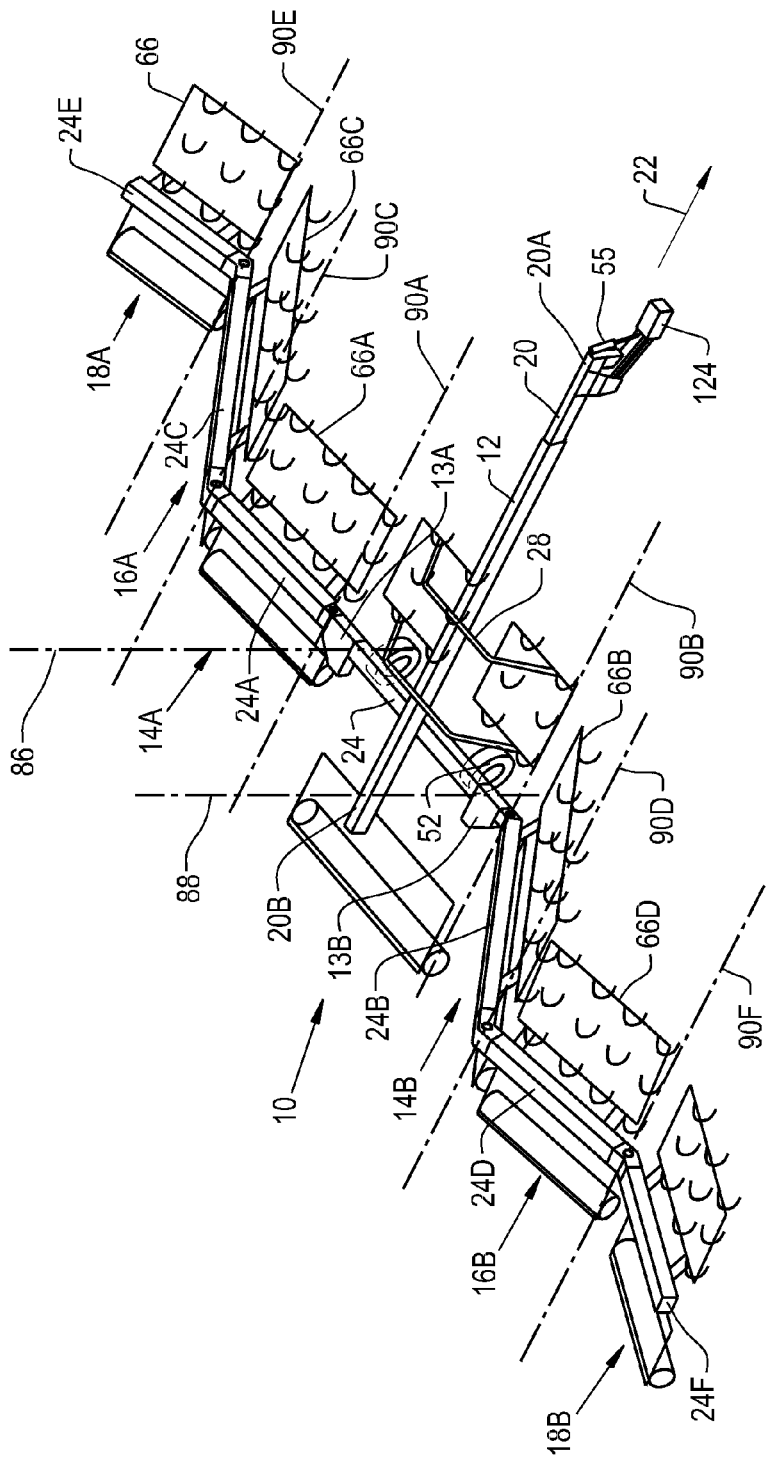
FIG. 9 is the same top perspective view shown in FIG. 8 with the longitudinal axes, showing the segmented wing sections articulating vertically.

FIG. 7 shows another side view of the agricultural tillage implement, similar to FIG. 6, with the main shank frame 28 shown in the transport position for clarity, the main frame 12 lowered, the center shank sub-frame 50 lowered, the crumbler basket 34 of the main rear auxiliary implement 30 lowered, and the wing front shank frames 66A, 66B, 66C, 66D, 66E, and 66F and wing section rear auxiliary implements 78A, 78B, 78C, 78D, 78E, and 78F in their generally horizontal positions;

FIGS. 8 and 9 show the main frame section 12 of the field cultivator 10 with the pull hitch tube 20, including the pull hitch tube forward end 20A and the pull hitch tube rearward end 20B. Main shank frame 28 is shown in its operating configuration and is positioned down and forward of tool bar 24. Left inner wing section segment 14A is provided with left inner tool bar segment 24A, and is connected to main frame section 12 at left intermediate wing 13A and can pivot about left generally vertical axis 86 and left inner longitudinal axis 90A. Right inner wing section segment 14B is provided with right inner tool bar segment 24B, and is connected to main frame section 12 at right intermediate wing 13B and can pivot about right generally vertical axis 88 and right inner longitudinal axis 90B. Left middle wing section segment 16A is provided with left middle tool bar segment 24C, and is connected to left inner wing section segment 14A and can pivot about left middle longitudinal axis 90C. Right middle wing section segment 16B is provided with right middle tool bar segment 24C, and is connected to right inner wing section segment 14B and can pivot about right middle longitudinal axis 90D. Left outer wing section segment 18A is provided with left outer tool bar segment 24E, and is connected to left middle wing section segment 16A and can pivot about left outer longitudinal axis 90E. Right outer wing section segment 18B is provided with right outer tool bar segment 24F, and is connected to right middle wing section segment 16B and can pivot about right outer longitudinal axis 90F. In this way, wing sections 14A, 14B, 16A, 16B, 18A, and 18B can articulate vertically to follow ground contours.

The sequence of steps to reconfigure the agricultural tillage implement from an operating configuration to a transport configuration may include pivoting the main shank frame 28 up and over the tool bar 24, pivoting the wing front shank frames 66A, 66B, 66C, 66D, 66E, and 66F to a generally vertical position and locking the wing front shank frames 66A, 66B, 66C, 66D, 66E, and 66F in the generally vertical position, and pivoting the wing sections 14A, 14B, 16A, 16B, 18A, and 18B about generally vertical axes 86 and 88 to a position adjacent to and generally parallel with the pull hitch tube 20. The sequence of steps to reconfigure the agricultural tillage implement from an operating configuration to a transport configuration may alternately include raising the main frame section 12 using hydraulic cylinder 54 connected to rear lift wheels 52 and using hydraulic cylinder 55 connected to pull hitch 124 while raising the wing sections 14A, 14B, 16A, 16B, 18A, and 18B using the toolbar lift wheels 53, raising the center shank sub-frame 50, pivoting the main shank frame 28 up and over the tool bar 24, raising the crumbler basket 34 of the main rear auxiliary implement 30, pivoting the wing front shank frames 66A, 66B, 66C, 66D, 66E, and 66F to a generally vertical position and locking the wing front shank frames 66A, 66B, 66C, 66D, 66E, and 66F in the generally vertical position, pivoting the wing section rear auxiliary implements 78A, 78B, 78C, 78D, 78E, and 78F to a generally vertical position and locking the wing section rear auxiliary implements 78A, 78B, 78C, 78D, 78E, and 78F in the generally vertical position, extending 20C the telescoping pull hitch tube 20, and pivoting the wing sections 14A, 14B, 16A, 16B, 18A, and 18B about generally vertical axes 86 and 88 to a position adjacent to and generally parallel with the telescoping pull hitch tube 20.

The sequence of steps to reconfigure the agricultural tillage implement from an operating configuration to a transport configuration may further include pivoting the wing front shank frames 66A, 66B, 66C, 66D, 66E, and 66F to a generally vertical position in a sequential manner, and may further include pivoting the wing section rear auxiliary implements 78A, 78B, 78C, 78D, 78E, and 78F to a generally vertical position in a sequential manner.

The sequence of steps to reconfigure the agricultural tillage implement from a transport configuration to an operating configuration may include pivoting the wing sections 14A, 14B, 16A, 16B, 18A, and 18B outward about generally vertical axes 86 and 88 to a position perpendicular to the pull hitch tube 20, unlocking and pivoting the wing front shank frames 66A, 66B, 66C, 66D, 66E, and 66F to a generally horizontal position, and pivoting the main shank frame 28 down and forward of the tool bar 24. The sequence of steps to reconfigure the agricultural tillage implement from a transport configuration to an operating configuration may alternately include contracting 20D the telescoping pull hitch tube 20, pivoting the wing sections 14A, 14B, 16A, 16B, 18A, and 18B outward about generally vertical axes 86 and 88 to a position perpendicular to the telescoping pull hitch tube 20, unlocking and pivoting the wing front shank frames 66A, 66B, 66C, 66D, 66E, and 66F to a generally horizontal position, unlocking and pivoting the wing section rear auxiliary implements 78A, 78B, 78C, 78D, 78E, and 78F to a generally horizontal position, pivoting the main shank frame 28 down and forward of the tool bar 24, lowering the crumbler basket 34 of the main rear auxiliary implement 30, lowering the center shank sub-frame 50, and lowering the main frame section 12 using hydraulic cylinder 54 connected to rear lift wheels 52 and using hydraulic cylinder 55 connected to pull hitch 124 while lowering the wing sections 14A, 14B, 16A, 16B, 18A, and 18B using the toolbar lift wheels 53.

The sequence of steps to reconfigure the agricultural tillage implement from a transport configuration to an operating configuration may further include pivoting the wing front shank frames 66A, 66B, 66C, 66D, 66E, and 66F to a generally horizontal position in a sequential manner, or may further include pivoting the wing section rear auxiliary implements 78A, 78B, 78C, 78D, 78E, and 78F to a generally horizontal position in a sequential manner.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural tillage implement, comprising:
a main frame section including a pull hitch tube extending in a travel direction;
a main shank frame pivotally coupled with said main frame section, said main shank frame operable to pivot up and over said main frame section when in a transport configuration, and operable to pivot down and forward of said main frame section in said travel direction when in an operating configuration; and
at least one wing section pivotally coupled with said main frame section about at least one generally vertical axis, said at least one wing section operable to pivot forward in said travel direction about said at least one generally vertical axis to a position adjacent to and generally parallel with said pull hitch tube when in said transport configuration, said at least one wing section operable to pivot outward about said at least one generally vertical axis to a position perpendicular to said pull hitch tube when in said operating configuration.

2. The agricultural tillage implement of claim 1, wherein:
said main frame section further comprises a tool bar attached to and extending transverse to said pull hitch tube; and
said main shank frame being pivotally coupled to said tool bar of said main frame section.

3. An agricultural tillage implement, comprising:
a main frame section including a pull hitch tube extending in a travel direction, said main frame section having a tool bar attached to and extending transverse to said pull hitch tube;
a main shank frame pivotally coupled with said main frame section, said main shank frame operable to pivot up and over said main frame section when in a transport configuration, and operable to pivot down and forward of said main frame section when in an operating configuration,
said main shank frame being pivotally coupled to said tool bar of said main frame section;
at least one wing section pivotally coupled with said main frame section about at least one generally vertical axis, said at least one wing section operable to pivot forward about said at least one generally vertical axis to a position adjacent to and generally parallel with said pull hitch tube when in said transport configuration, said at least one wing section operable to pivot outward about said at least one generally vertical axis to a position perpendicular to said pull hitch tube when in said operating configuration, wherein:
said main shank frame further comprises a left main shank sub-frame and a right main shank sub-frame, said main shank frame straddling said pull hitch tube when in said operating configuration, such that said left main shank sub-frame is beneath and to the left of said pull hitch tube and said right main shank sub-frame is beneath and to the right of said pull hitch tube.

4. The agricultural tillage implement of claim 3, wherein:
said at least one wing section further comprises at least one segmented wing section, said at least one segmented wing section allowing vertical articulation; and
said tool bar further comprises a segmented tool bar, said segmented tool bar allowing vertical articulation, said segmented tool bar extending at least to an outermost wing section segment.

5. The agricultural tillage implement of claim 4, further comprising:
at least one wing front shank frame pivotally attached to said at least one segmented wing section, said at least one wing front shank frame operable to pivot to a generally vertical position when in said transport configuration and operable to pivot to a generally horizontal position when in said operating configuration.

6. The agricultural tillage implement of claim 5, wherein:
said at least one segmented wing section further comprises a left inner wing section segment, a left middle wing section segment, a left outer wing section segment, a right inner wing section segment, a right middle wing section segment, and a right outer wing section segment; and
said at least one wing front shank frame further comprises a left inner wing front shank frame, a left middle wing front shank frame, a left outer wing front shank frame, a right inner wing front shank frame, a right middle wing front shank frame, and a right outer wing front shank frame.

7. The agricultural tillage implement of claim 4, further comprising:
at least one wing section rear auxiliary implement pivotally coupled with said at least one segmented wing section, said at least one wing section rear auxiliary implement operable to pivot to a generally vertical position when in said transport configuration and operable to pivot to a generally horizontal position when in said operating configuration.

8. The agricultural tillage implement of claim 4, further comprising:
at least one diagonally angled draft tube extending from said at least one segmented wing section to a forward end of said pull hitch tube;
said at least one segmented wing section being pivotally coupled with said main frame section about said at least one generally vertical axis at a rearward end of said pull hitch tube; and
said pull hitch tube further comprising a telescoping pull hitch tube, said telescoping pull hitch tube and said at least one diagonally angled draft tube cooperating to pivot said at least one segmented wing section forward about said at least one generally vertical axis to said position adjacent to and generally parallel with said telescoping pull hitch tube upon extension, and said telescoping pull hitch tube and said at least one diagonally angled draft tube cooperating to pivot said at least one segmented wing section outward about said at least one generally vertical axis to said position perpendicular to said telescoping pull hitch tithe upon contraction.

9. A series of at least two coupled wing section segments for an agricultural tillage implement, said series of at least two coupled wing section segments comprising:
at least one inner wing section segment being pivotally connected about at least one generally vertical axis to a main frame section of the agricultural tillage implement and about at least one inner longitudinal axis, said at least one inner wing section segment being operable to pivot forward about said at least one generally vertical axis to a position adjacent to and generally parallel with said main frame section when in a transport configuration, and being operable to pivot outward about said at least one generally vertical axis to a position perpendicular to said main frame section when in an operating configuration, and being further operable to pivot vertically about said at least one inner longitudinal axis, said at least one inner wing section including at least one segmented toolbar inner segment;
at least one additional wing section segment pivotally connected about at least one additional generally longitudinal axis to said at least one inner wing section segment, said at least one additional wing section segment being operable to pivot vertically about its connection to said at least one inner wing section segment, said at least one additional wing section segment including at least one segmented toolbar segment;
at least one inner wing front shank frame pivotally connected to said at least one inner wing section segment, said at least one inner wing front shank frame being operable to pivot to a generally vertical position when in said transport configuration, and being operable to pivot to a generally horizontal working position forward of said at least one inner wing section segment in a travel direction when in said operating configuration; and at least one additional wing front shank frame pivotally connected to said at least one additional wing section segment, said at least one additional wing front shank frame being operable to pivot to a generally vertical position when in said transport configuration, and being operable to pivot to a generally horizontal working position forward of said at least one additional wing section segment in a travel direction when in said operating configuration.

10. The series of at least two coupled wing section segments for an agricultural tillage implement of claim 9, wherein:

said at least one inner wing section segment further comprises a left inner wing section segment and a right inner wing section segment;

said at least one segmented toolbar inner segment further comprises a left segmented toolbar inner segment and a right segmented toolbar inner segment;

said at least one additional wing section segment further comprises a left middle wing section segment, a left outer wing section segment, a right middle wing section segment, and a right outer wing section segment, said left middle wing section segment being pivotally connected about a left middle longitudinal axis to said left inner wing section segment and being operable to pivot vertically about its connection to said left inner wing section segment, said left outer wing section segment being pivotally connected about a left outer longitudinal axis to said left middle wing section segment and being operable to pivot vertically about its connection to said left middle wing section segment, said right middle wing section segment being pivotally connected about a right middle longitudinal axis to said right inner wing section segment and being operable to pivot vertically about its connection to said right inner wing section segment, said right outer wing section segment being pivotally connected about a right outer longitudinal axis to said right middle wing section segment and being operable to pivot vertically about its connection to said right middle wing section segment; and said at least one additional wing front shank frame further comprises a left middle wing front shank frame pivotally connected to said left middle wing section segment, a left outer wing front shank frame pivotally connected to said left outer wing section segment, a right middle wing front shank frame pivotally connected to said right middle wing section segment, and a right outer wing front shank frame pivotally connected to said right outer wing section segment, said left middle wing front shank frame, said left outer wing front shank frame, said right middle wing front shank frame, and said right outer wing front shank frame each being operable to pivot to a generally vertical position when in said transport configuration and being operable to pivot to a generally horizontal position when in said operating configuration.

11. The series of at least two coupled wing section segments for an agricultural tillage implement of claim 9, further comprising:

at least one inner wing section rear auxiliary implement pivotally connected to said at least one inner wing section segment, said at least one inner wing section rear auxiliary implement being operable to pivot to a generally vertical position when in said transport configuration, and being operable to pivot to a generally horizontal position when in said operating configuration;

at least one additional wing section rear auxiliary implement pivotally connected to said at least one additional wing section segment, said at least one additional wing section rear auxiliary implement being operable to pivot to a generally vertical position when in said transport configuration, and being operable to pivot to a generally horizontal position when in said operating configuration.

12. An agricultural tillage implement, comprising:

a main frame section including a telescoping pull hitch tube extending in a travel direction, said telescoping pull hitch tube having a forward end and a rearward end;

a tool bar attached to and extending transverse to said telescoping pull hitch tube;

at least one rear lift wheel and a pull hitch connected to said main frame section and operable to raise and lower said main frame section using at least one hydraulic cylinder;

a main shank frame pivotally coupled with said tool bar, said main shank frame operable to pivot up and over said tool bar when in a transport configuration, and operable to pivot down and forward of said tool bar when in an operating configuration;

at least one wing section pivotally coupled with said main frame section about at least one generally vertical axis at said rearward end of said telescoping pull hitch tube, said at least one wing section operable to pivot forward about said at least one generally vertical axis to a position adjacent to and generally parallel with said telescoping pull hitch tube when in said transport configuration, said at least one wing section operable to pivot outward about said at least one generally vertical axis to a position perpendicular to said telescoping pull hitch tube when in said operating configuration;

at least one diagonally angled draft tube extending from said at least one wing section to said forward end of said telescoping pull hitch tube; and said telescoping pull hitch tube and said at least one diagonally angled draft tube cooperating to pivot said at least one wing section forward about said at least one generally vertical axis to said position adjacent to and generally parallel with said telescoping pull hitch tube upon extension of said telescoping pull hitch tube, and said telescoping pull hitch tube and said at least one diagonally angled draft tube cooperating to pivot said at least one segmented wing section outward about said at least one generally vertical axis to said position perpendicular to said telescoping pull hitch tube upon contraction of said telescoping pull hitch tube.

13. The agricultural tillage implement of claim 12, further comprising:

at least one wing front shank frame pivotally coupled with said at least one wing section, said at least one wing front shank frame operable to pivot to a generally vertical position when in said transport configuration and operable to pivot to a generally horizontal position when in said operating configuration.

14. The agricultural tillage implement of claim 13, wherein:

said at least one wing section further comprises a left inner wing section, a left middle wing section, a left outer wing section, a right inner wing section, a right middle wing section, and a right outer wing section;

said at least one wing front shank frame further comprises a left inner wing front shank frame, a left middle wing front shank frame, a left outer wing front shank frame, a right inner wing front shank frame, a right middle wing front shank frame, and a right outer wing front shank frame;

said at least one diagonally angled draft tube further comprises a left diagonally angled draft tube and a right diagonally angled draft tube; and said tool bar further comprises a segmented tool bar, said segmented tool bar allowing vertical articulation and extending over said left inner wing section, said left middle wing section, said left outer wing section, said right inner wing section, said right middle wing section, and said right outer wing section.

15. The agricultural tillage implement of claim 12, further comprising:

at least one wing section rear auxiliary implement pivotally coupled with said at least one wing section, said at least one wing section rear auxiliary implement operable to pivot to a generally vertical position when in said transport configuration and operable to pivot to a generally horizontal position when in said operating configuration.

16. The agricultural tillage implement of claim 15, wherein:

said at least one wing section further comprises a left inner wing section, a left middle wing section, a left outer wing section, a right inner wing section, a right middle wing section, and a right outer wing section;

said at least one wing section rear auxiliary implement further comprises a left inner wing section rear auxiliary implement, a left middle wing section rear auxiliary implement, a left outer wing section rear auxiliary implement, a right inner wing section rear auxiliary implement, a right middle wing section rear auxiliary implement, and a right outer wing section rear auxiliary implement;

said at least one diagonally angled draft tube further comprises a left diagonally angled draft tube and a right diagonally angled draft tube; and said tool bar further comprises a segmented tool bar, said segmented tool bar allowing vertical articulation and extending over said left inner wing section, said left middle wing section, said left outer wing section, said right inner wing section, said right middle wing section, and said right outer wing section.

17. The agricultural tillage implement of claim 12, further comprising:

said main shank frame further comprises a left main shank sub-frame and a right main shank sub-frame, said main shank frame straddling said telescoping pull hitch tube when in said operating configuration, such that said left main shank sub-frame is beneath and to the left of said telescoping pull hitch tube and said right main shank sub-frame is beneath and to the right of said telescoping pull hitch tube.

18. The agricultural tillage implement of claim 12, further comprising:

a crumbler basket of a main rear auxiliary implement pivotally coupled with said main rear auxiliary implement, said crumbler basket operable to be raised and lowered; and a center shank sub-frame attached to and positioned said telescoping pull hitch tube, said center shank sub-frame operable to be raised and lowered.

\* \* \* \* \*